United States Patent [19]
Hurst

[11] 3,897,305
[45] July 29, 1975

[54] PROCESS FOR PRODUCING DEXTROSE

[75] Inventor: Thomas L. Hurst, Decatur, Ill.

[73] Assignee: A. E. Staley Manufacturing Company, Decatur, Ill.

[22] Filed: Dec. 17, 1973

[21] Appl. No.: 425,665

Related U.S. Application Data

[63] Continuation of Ser. No. 755,093, Aug. 26, 1968, abandoned.

[52] U.S. Cl................................................ 195/31 R
[51] Int. Cl............................................... C12b 1/00
[58] Field of Search .................................. 195/31 R

[56] References Cited
UNITED STATES PATENTS
2,891,869  6/1959  Langlois........................... 175/31 R

OTHER PUBLICATIONS
Bender et al., "Pullulanase", Methods in Enzymology, Vol. VIII, pg. 555–559, 1966.

Pazur, Starch: Chemistry and Technology, Vol. 1, p. 166, 1965.

*Primary Examiner*—Lionel M. Shapiro
*Attorney, Agent, or Firm*—M. Paul Hendrickson; Charles J. Meyerson

[57] ABSTRACT

A method for converting starch to dextrose by saccharifying a starch hydrolyzate with an enzyme system comprising glucoamylase and amylo-1,6-glucosidase at a pH which will inhibit the reversionary action of glucoamylase. Preferably the starch hydrolyzate is obtained by thinning starch with an enzyme such as alpha-amylase and is saccharified with the above enzyme system at a pH of between 4.5 and 6.7.

20 Claims, 3 Drawing Figures

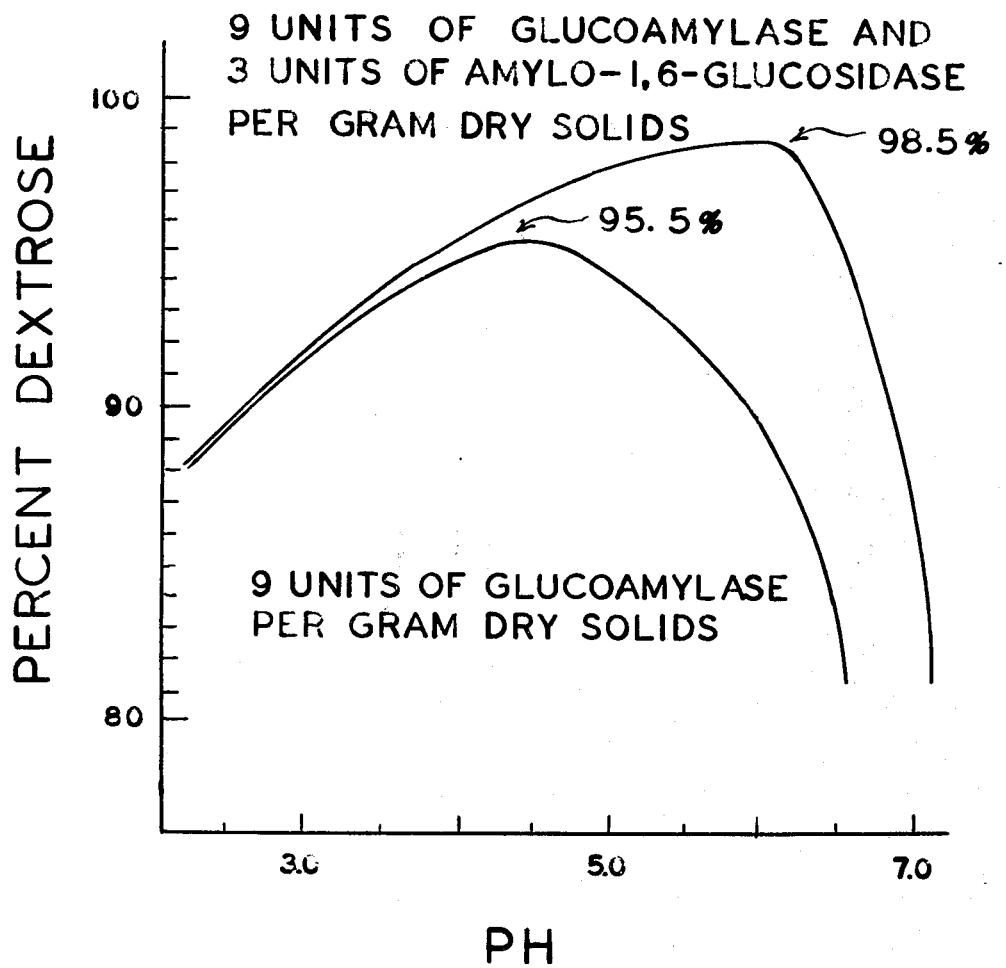

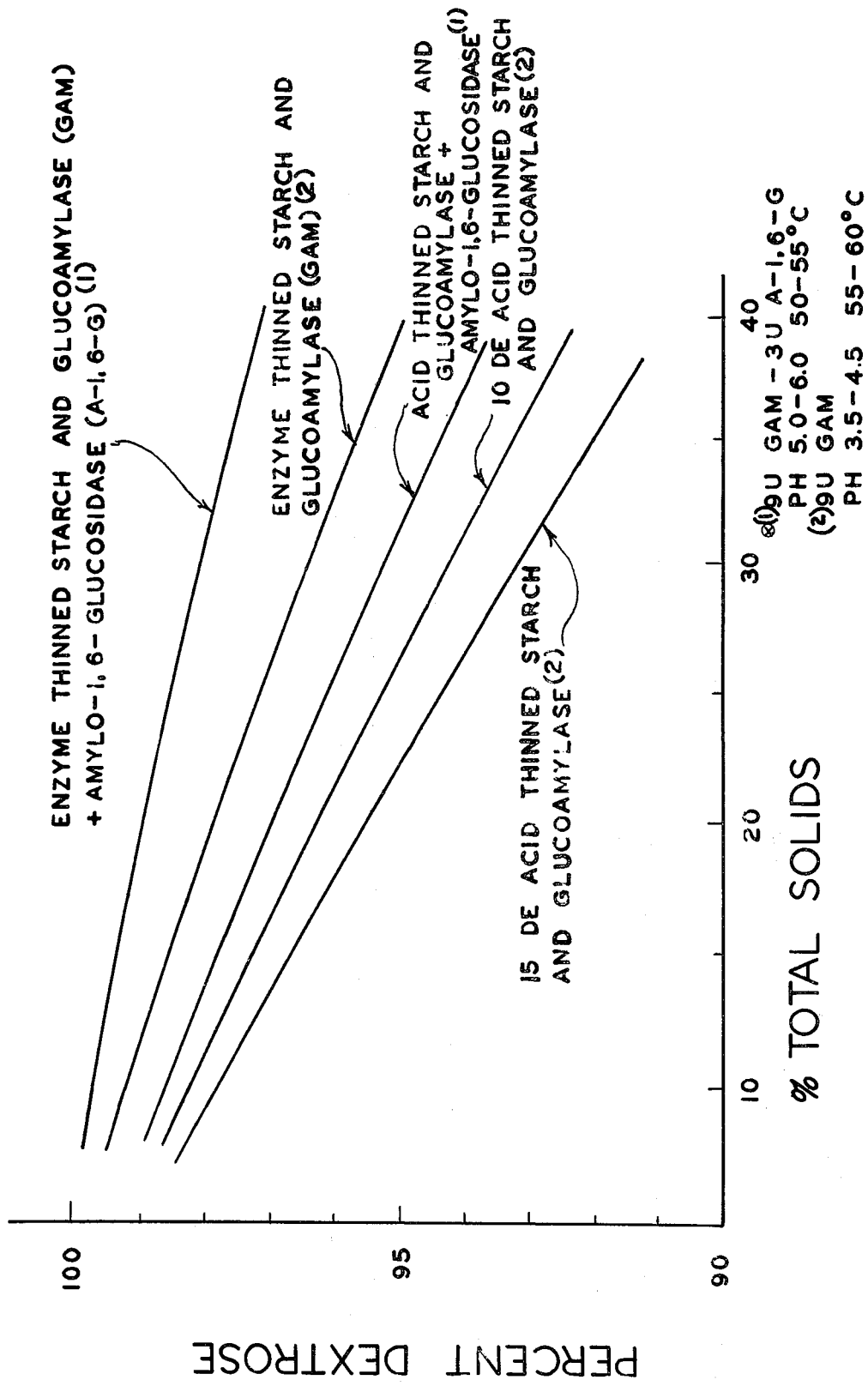

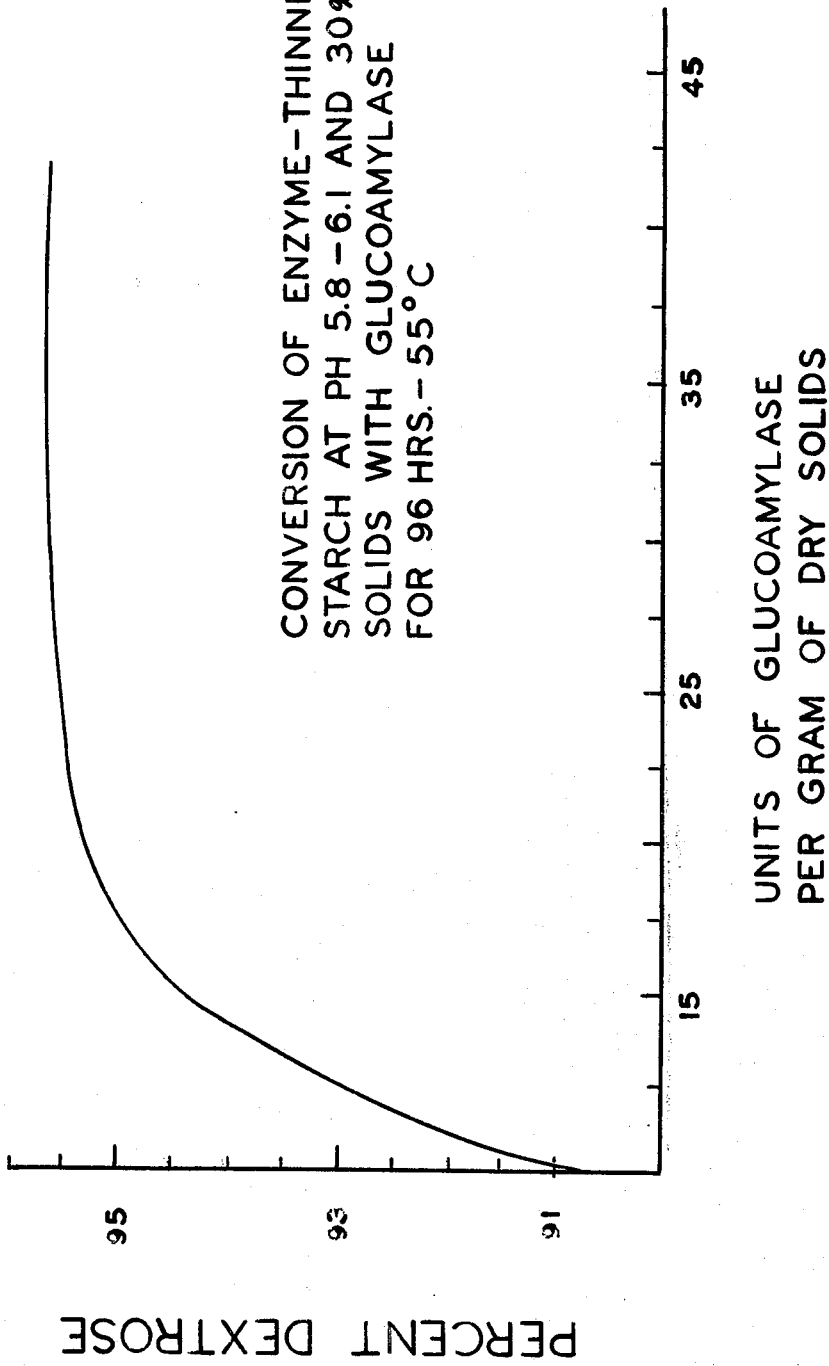

PROCESS FOR PRODUCING DEXTROSE

This application is a continuation of application Ser. No. 755,093, now abandoned, which was filed on Aug. 26, 1968.

BACKGROUND OF THE INVENTION

The broad, general technology for producing sugars, and particularly dextrose, from starch is well known. This technology is well summarized on pages 553–568 of *Starch Chemistry and Technology*, Vol. 2 by Whistler & Paschall.

Initially dextrose syrups were commercially produced by hydrolyzing starches with acids. The problem of producing dextrose by acid hydrolysis was that considerable quantities of by-products were formed during conversion because of the lack of specificity of the acid hydrolyzing agent. These by-products detracted from the yield of dextrose and increased the amount of refining required to produce a good quality dextrose syrup product.

A major technological advance by the dextrose syrup industry was achieved upon adaptation of glucoamylase as a means of saccharifying starches to dextrose. The glucoamylase saccharification process alleviated the formation of undesirable by-products which were inherently produced by the acid process. As a result of this advance, the dextrose syrup industry was able to produce high dextrose syrups which contained about 92–95% by weight dextrose. The glucoamylase saccharification process also enabled the industry to increase the starch solids content of the saccharification media to a higher level while still maintaining the dextrose content of the syrup well above those produced by the acid process.

Unfortunately the production of high dextrose syrups by glucoamylase has been plagued with a plurality of problems which have heretofore placed a maximum limit on dextrose conversion. Realization of more complete starch conversion by glucoamylase to dextrose has become an impregnable economic problem. When a thinned starch hydrolyzate of a low starch content is saccharified with a pure glucoamylase preparation, the resultant dextrose conversion syrup will normally have an extemely high dextrose content (e.g., 97% or higher) as well as being essentially free of non-dextrose saccharide impurities. However, if the thinned starch hydrolyzate solids are increased to a level, as economically required by the industry, the dextrose content of the resultant dextrose syrup product is substantially decreased with a concomitant increase in non-dextrose, saccharide impurities. The dextrose syrup industry has commercially accepted a dextrose syrup of a lower dextrose content in order to take advantage of the economics which are achieved by conducting the saccharification at a higher starch solids level.

The dextrose syrup producers desire to obtain a more complete starch conversion to dextrose at the highest possible starch solids conversion level. Extensive research efforts have been expended towards the accomplishment of this objective. Many researchers have deemed the solution to the problem as being simply a matter of discovering a particular glucoamylase strain which would inherently yield a higher dextrose syrup. In this endeavor, the art has screened, mutated and prepared thousands of different glucoamylase preparations.

Researchers have also discovered that glucoamylase preparations possessed the undesirable enzymatic activity of polymerizing the dextrose, which was produced by glucoamylase, to saccharides of a higher degree of polymerization. In general, these polymerized higher saccharides (e.g., isomaltose) cannot be hydrolyzed by glucoamylase to dextrose. Thus, the higher saccharides produced during the glucoamylase saccharification process normally accompany the syrup as an undesirable by-product.

Researchers also discovered that enzymatic impurities in the glucoamylase preparations were a contributing factor to the polymerization of dextrose to higher saccharides. Numerous purification processes to remove undesirable enzymatic impurities (identified by the art as transglucosidase) were proposed and commercially utilized to provide an improved dextrose saccharifying enzyme. The researchers also discovered transglucosidase activity and the amount of polymerized higher saccharide as being pH dependent. It became evident that significant repression of transglucosidase activity would occur if the saccharification process were conducted at a pH of less than 4.5 and preferably at the pH 4.0 level. Commercially, a saccharification pH above 4.5 significantly increases the activity of the transglucosidase with a concomitant increase in higher saccharide impurities.

A process for producing corn syrups having a predetermined saccharide content is disclosed in U.S. Pat. No. 2,891,869 by D. P. Langlois. These corn syrups can be prepared by initially hydrolyzing a starch with acid and saccharifying the acid hydrolyzed starch with two or more enzymes possessing distinctly different starch converting characteristics. In Langlois, glucoamylase is disclosed as a dextrose producing enzyme. Malt diastase, alpha-amylase and beta amylase are maltose producing enzymes. By combining glucoamylase with one or more of the maltose producing amylases, the Langlois process enabled the industry to tailor-make a corn syrup which contained a predetermined amount of dextrose and maltose. As disclosed in Langlois, it is conventional in the production of maltose containing syrups to employ a pH which is substantially higher (e.g., 5.5) than one would employ in a process for producing the high dextrose syrups. An elevated saccharification pH favors maltose production whereas a lower pH will favor the dextrose saccharification reaction.

The Langlois patent has been extensively used in the commercial production of syrups which contain both maltose and dextrose. The commercial production of high dextrose syrups, however, has relied exclusively upon glucoamylase as the sole starch converting enzyme.

On page 200 of a publication entitled "Reversible Action of Pullulanase", Vol. 210, NATURE 1966, by M. Abdullah and D. French, it is disclosed that pullulanase can hydrolyze 1,6 starch linkages. This publication further discloses that pullulanase can polymerize disaccharides to higher saccharide products. The saccharide polymerization activity of the pullulanase becomes more prevalent as the saccharide concentation increases. These polymerized saccharide products, as disclosed in the NATURE publication, are not hydrolyzable by either pullulanase or glucoamylase.

For many years it was believed that glucoamylase was capable of only hydrolyzing starch to dextrose. However, more recently it has been found that glucoamylase is also capable of polymerizing dextrose to nondextrose products such as isomaltose and isomaltotriose and other alpha-D-(1,6)-linked oligosaccharides. This polymeriztion of reversionary action helps to explain why it is so difficult to obtain a quantitative hydrolysis of starch to dextrose, particularly when using an enzyme such as glucoamylase as the hydrolyzing agent. Although the reason for this reversionary action is, at the present time, not fully understood, it is believed to be associated with the fact that enzyme reactions are reversible and that if the action of an enzyme is allowed to continue over an extended period of time, a product equilibrium will eventually be established. A more complete discussion on the reversionary action or back polymerization of saccharifying enzymes can be found in *International Chemical Engineering*, Vol. 4, No. 3, pages 530–534 (1964).

The polymerizing or reversionary action of, for example, glucoamylase can be altered to some degree by modifying the conditions under which the starch material is saccharified. For example, the starch conversion process can be conducted on a starch concentration which is lower (e.g. 10%) than the more economically desirable starch concentration of 30–40%. Generally, though, the increased yield of dextrose realized by utilizing a lower starch concentration is not high enough to offset the added expense which is incurred in crystallizing or concentrating the diluted dextrose solution.

Another approach which has been proposed is to conduct the saccharification action at a pH which would be less favorable to the polymerization or reversionary action of glucoamylase. The problem with this approach is that any significant change in the pH also lowers substantially the activity of the enzyme for producing dextrose. To overcome or offset this loss in enzyme activity, it becomes necessary to increase the amount of enzyme used during the saccharification process particularly if comparable yields of dextrose are to be maintained. The increase in cost resulting from the use of additional enzyme as well as the added cost incurred in removing the increased impurities resulting from the use of larger amounts of enzyme make such an enzyme saccharification process economically unattractive.

SUMMARY OF THE INVENTION

This invention relates to an improved method for saccharifying starch by treating a starch hydrolyzate with a combination or mixture of hydrolyzing enzymes within a particular pH range. More particularly, this invention is directed to a method for consistently producing dextrose in high yields by saccharifying cooked or thinned starches with an enzyme system comprising glucoamylase and amylo-1,6-glucosidase under conditions such that the reversionary action of glucoamylase is inhibited.

OBJECTS

It is an object of this invention to provide a method for producing dextrose which not only overcomes the problems heretofore encountered but also overcomes these problems more efficiently and more economically.

Another object of this invention is to provide a starch saccharification process capable of producing substantially higher yields of dextrose.

Another object of this invention is to provide a dextrose producing enzyme system which can be utilized under conditions which inhibit the formation of dextrose reversionary products.

Other objects and advantages of this invention will be apparent from the disclosure and drawings.

DRAWINGS

FIG. 1 graphically shows the effect that pH has on the conversion of starch to dextrose with glucoamylase both in the presence and absence of amylo-1,6-glucosidase.

FIG. 2 graphically shows the effect that total solids has on dextrose yields for various enzyme saccharification systems.

FIG. 3 graphically shows what effect increase concentrations of glucoamylase has on yields of dextrose at pH levels of about 6.0.

DETAILED DESCRIPTION OF THE INVENTION

Throughout the disclosure and claims of this application the abbreviation "D" will be used to represent the dextrose content of a solution (as distinguished from the content of other sugars and dextrin) and is given as the percent by weight of dextrose in a solution. The "D" values reported herein were determined by measuring the solution's specific rotation and comparing these readings with the specific rotations obtained from prepared standards having known concentrations of dextrose. It has been found that this technique, when compared with other test procedures, has a confidence level of 95%.

The process of the present invention is characterized generally by its efficiency, reliability, reproducibility in either small or large scale operations, its adaptability to either batch type or continuous type conversions and equipment, and the ease with which the enzyme conversion product may be refined and, if desired, crystallized. In one of its preferred embodiments, the saccharification process of this invention is further characterized by the steps and conditions presented below.

1. A slurry of starch is prepared by mixing granular starch with water to a Baume of between 20–25°.
2. The starch slurry is then thinned to a D.E. of preferably between 15–20, as by the use of an acid or preferably an enzyme or by combinations thereof.
3. The thinned starch slurry is then adjusted, if necessary, to a pH of between 4.5 and 6.7, preferably to a pH of between 5.9 and 6.3, and a solids content of between 20–55% solids.
4. The adjusted starch hydrolyzate is saccharified by adding an enzyme system comprising glucoamylase and amylo-1,6-glucosidase to the starch hydrolyzate and maintaining the hydrolyzate at a temperature of between 50°–55°C. for a period of time ranging from 24–100 hours or for a time sufficient to obtain the desired conversion to dextrose.
5. After the desired degree of saccharification is obtained, the enzymes are deactivated by heating the mixture to a temperature of between 74°–94°C. when deemed necessary.
6. Finally, the dextrose solution is refined and concentrated to a Baume of 40°–45° and a solids content of 78–85% or if desired, can be crystallized.

Of the six steps listed above, the most pertinent is the saccharification step.

The saccharification step (that is, the step wherein a thinned starch hydrolyzate is converted to dextrose) comprises contacting a starch hydrolyzate with an enzyme system comprising glucoamylase (an enzyme capable of hydrolyzing starch to dextrose) and amylo-1,6-glucosidase (an enzyme capable of hydrolyzing the amylopectin fraction of starch at its 1–6 glucosidic linkages) under conditions which will inhibit the reversionary action (conversion of dextrose to non-dextrose products) of glucoamylase.

The enzyme glucoamylase used in the saccharification step can be obtained from a number of different microorganisms, particularly of the Aspergillus, Clostridium, Mucor and Rhizopus genera in accordance with known methods such as those described in Liggett et al. U.S. Pat. No. 2,881,115 and Langlois et al. U.S. Pat. No. 2,893,921. Satisfactory glucoamylase preparations in the form of filtered culture broths can be obtained from selected strains of *Aspergillus niger* according to the teachings of U.S. Pat. No. 2,557,078 and from selected strains of *Aspergillus phoenicis* according to U.S. Pat. Nos. 2,881,115 and 2,893,921.

Since glucoamylase preparations will also normally contain appreciable amounts of interfering enzymes, including transglucosidase (enzyme capable of polymerizing dextrose to non-fermentable polysaccharides), it is highly desirable to remove substantially all of these interfering enzymes before the glucoamylase is used to saccharify starch to dextrose. There are several known procedures for refining glucoamylase so as to render it substantially free of interfering enzymes. Suitable refining procedures are described in U.S. Pat. Nos. 3,067,108 and 3,047,471 to Hurst et al. and in U.S. Pat. Nos. 2,967,804 and 2,970,086 to Kerr. The effect which transglucosidase has on the saccharification of starch with glucoamylase is reported in *Cereal Chemistry*, Vol. 43, pages 658–669 (1966).

The enzyme amylo-1,6-glucosidase, quite often referred to as "pullulanase", is an enzyme capable of selectively hydrolyzing only alpha-1,6-glucosidic bonds of the amylopectin fraction of starch. Other enzymes capable of hydrolyzing alpha-1,6-glucosidic bonds are referred to in the literature as "iso-amylase" and "R enzyme."

The preparation of an enzyme exhibiting amylo-1,6-glucosidase activity was reported by Bender & Wallenfels in *Biochemische Zeitschrift*, Vol. 334, pages 79–95 (1961). Other information covering the use and production of this enzyme can be found in *Methods of Enzymology*, Vol. 8, pages 555–559 (1966). According to the above references, amylo-1,6-glucosidase can be readily obtained from the organism *Aerobacter aerogenes*. Certain strains of the organism, *Aerobacter aerogenes*, have been reported to be particularly good sources for obtaining this enzyme. For example, *Aerobacter aerogenes* (U–58), which is reported to be a direct descendant of the original strain isolated by Bender & Wallenfels, has been found to be a particularly good source of this enzyme. Various ultraviolet induced mutants of *Aerobacter aerogenes* (U–58) can also be used. Other reported strains of *Aerobacter aerogenes* which can be used include *Aerobacter aerogenes* ATCC 9621 and ATCC 15050.

Preparations of amylo-1,6-glucosidase or pullulanase can be obtained from the organism *Aerobacter aerogenes* by known cultivating methods. A suitable technique is described in the Bender & Wallenfels publication previously referred to. If desired, the crude preparation can be purified prior to use. However, the utility of the enzyme in the process of this invention is not restricted to preparations of any specific purity. Obviously, though, the use of an enzyme substantially free of contaminants would be advantageous.

The amount of glucoamylase and amylo-1,6-glucosidase which should be used to saccharify starch to dextrose is dependent on many factors such as (1) the potency of the enzymes, (2) the conditions of saccharification (e.g., pH, temperature, starch solids content, etc.), (3) conversion times and (4) enzyme and processing costs. In order that this invention provide a more economical as well as a more efficient process for saccharifying starch to dextrose, the amounts of enzymes used are preferably those amounts which are capable of producing the highest yields of dextrose at a minimum of cost. Since the largest single cost item in an enzyme saccharification process is the enzyme, as little of the enzyme as is practical is preferably used. With the processs of this invention, high yields of dextrose have been consistently obtained by using as little as 4–15 units of glucoamylase per gram of starch dry solids and from 0.5–6.0 units of amylo-1,6-glucosidase per gram of dry solids. As more highly purified enzymes become more readily available, larger amounts of the enzyme can be used, if desired.

The potency or activity units of glucoamylase and amylo-1,6-glucosidase referred to above are, for purposes of this invention, defined as follows:

One unit of glucoamylase is defined as that amount of enzyme which will convert 100 mg. of starch essentially to dextrose in 48 hours at 60°C. and pH 4.0. One unit of amylo-1,6-glucosidase is defined as that amount of enzyme present in 1.0 ml. of solution which, with excess pullulan as a substrate under standard conditions of assay, raises the reducing value within 1 hour at 45°C. to a value which is equivalent to one mg. of maltose.

Conversion times of between 48–210 hours are generally sufficient to effect a conversion of starch to dextrose with the enzyme system of this invention. However, these conversion times may be increased or decreased, as desired, by slightly increasing or decreasing the amount of the enzyme used during saccharification.

The thinned starch hydrolyzate which is preferably used by the enzyme system and process of this invention is preferably obtained by using a thinning enzyme such as alpha amylase. However, mineral acids, such as hydrochloric or sulfuric acid, can be used if desired. Generally, though, the use of an enzyme thinned hydrolyzate possesses certain advantages over an acid thinned hydrolyzate. One of these advantages is that higher yields of dextrose are possible if an enzyme thinned starch hydrolyzate rather than an acid thinned starch hydrolyzate is used. This advantage is depicted in FIG. 2. Another advantage in using alpha amylase as the thinning enzyme is that the alpha amylase tends to inhibit retrogradation of the thinned starch during saccharification by an enzyme system comprising glucoamylase and amylo-1,6-glucosidase.

The present invention makes possible the production of dextrose from starches and starch containing materials of most any type, variety, or purity. For example, dextrose can be produced from cereal starch such as corn, rice, sorghum and wheat; root starch, such as potato and tapioca; waxy starch, such as waxy corn and waxy sorghum; high-amylose starch; separated starch fractions, i.e., amylose and amylopectin; crude or unrefined amylaceous materials such as steeped corn; similarly, starch that has been modified as by oxidation or acid hydrolysis. Mixtures or combinations of any of the above can also be used to advantage.

As has been previously stated, one of the advantages of this invention, is that, when an enzyme system comprising amylo-1,6-glucosidase and glucoamylase is used to saccharify starch to dextrose, consistently higher yields of dextrose are obtained. It is believed that this increase in yield is due to the unexpected ability of this enzyme system (glucoamylase and amylo-1,6-glucosidase) to saccharify starch at a pH which tends to inhibit the reversionary action of glucoamylase. This effect is graphically depicted in FIG. 1, which compares the percent yield of dextrose produced by two enzyme systems (one comprising glucoamylase and the other comprising glucoamylase and amylo-1,6-glucosidase) at various pH values. FIG. 1 further shows that at a pH 6.0–6.2 yields of dextrose as high as 99%+ can be obtained when an enzyme system comprising glucoamylase and amylo-1,6-glucosidase is used; but when the enzyme system comprises glucoamylase without amylo-1,6-glucosidase optimum yields of about 96% were obtained. It is believed that by conducting the saccharification at a pH of about 6.0–6.2 little, if any, polymerization or reversionary action by glucoamylase occurs.

FIG. 2 shows, at a pH of 5.0–6.0, that with an enzyme system of glucoamylase and amylo-1,6-glucosidase substantially higher yields of dextrose are possible even as the total solids content is increased. From a commercial standpoint, this is an extremely important aspect since evaporation (required when crystallizing or when concentrating dextrose solutions) and purification costs are substantially reduced.

FIG. 3 shows that even as the amount of glucoamylase is increased from 10 units to 40 units per gram of starch D.S. the dextrose yields still remain below 96%. The results depicted in FIG. 3 may be compared with the results reported in, for example, Table I where dextrose yields in excess of 99% were obtained. It is, therefore, possible with the enzyme system of this invention to obtain maximum yields of dextrose with minimum quantities of enzyme.

The saccharification of starch to dextrose can be accomplished on any type of amylaceous material. However, a starch hydrolyzate which has been thinned to a D.E. of less than 35 and has a solids content of less than 55% is preferred. During saccharification (in presence of glucoamylase and amylo-1,6-glucosidase), the starch hydrolyzate is maintained at a pH of between 5.0 and 6.7 (advantageously at a pH of at least 5.5) and a temperature of between 25° and 60°C. Preferably the starch hydrolyzate is maintained at a pH of between 5.8 and 6.3 and a temperature of between 45° and 55°C. Under these conditions, the desired degree of saccharification can be achieved within a period of between about 30 and 100 hours.

The following examples are merely illustrative embodiments of this invention and are not intended as specific limitations thereof.

EXAMPLES 1–14

One thousand g. of Pure Food Powdered corn starch (about 900 g. of dry solids) were slurried in 1500 ml. of tap water. Two and one half g. of $CaCO_3$ were added, and the pH was adjusted to 6.2 with a sodium carbonate solution. The starch slurry was jet cooked and held at 56 p.s.i.g. steam pressure (149°C.) for 10 minutes. The cooked paste was then introduced into 200 ml. of water containing 1.0 ml. of the bacterial alpha-amylase (Aquazyme 120). The paste was mixed vigorously with the enzyme solution and the temperature in the receiving vessel was maintained at 77°C.–85°C. by controlling the flow of paste. When all the starch paste had been mixed with the alpha-amylase, the temperature of the solution was quickly lowered to 60°C. and 2.1 ml. (about 9,900 units as previously defined) of Novo glucoamylase were added. The temperature was further lowered to about 50°C., and aliquot samples were weighed out. The samples were treated in different ways with varied amounts of amylo-1,6-glucosidase to show the effects of pH, levels of enzymes, temperature of incubation, time of incubation, and concentration of dry solids have on dextrose yields. The amylo-1,6-glucosidase was added as an aqueous solution. The amylo-1,6-glucosidase was derived from the organism *Aerobacter aerogenes* by the process reported in *Biochemische Zeitschrift*, Vol. 334, pages 79–95 (1961). With the enzymes added, the starch slurry was converted at 48°–50°C. and at 5.6–5.9 pH for 48 hours. Within a period of 72 or 96 hours, the enzyme conversion was arrested by sparging with steam sufficient to raise the temperature to 90°C. in 5 minutes, which temperature was maintained for about 10 minutes.

The D. values for the various enzyme combinations were determined and are reported in Table I.

TABLE I

| Example | Glucoamylase units/g. | Amylo-1,6-glucosidase units/g. | pH | Temp. °C. | Time Hrs. | D.S. | D. |
|---|---|---|---|---|---|---|---|
| 1 | 11.0 | — | 5.9 | 55 | 72 | 30.0 | 89.1 |
| 2 | 11.0 | 2.0 | 6.0 | ″ | ″ | ″ | 97.3 |
| 3 | 11.0 | 4.0 | 6.1 | ″ | ″ | ″ | 95.8 |
| 4 | 11.0 | — | 5.4 | 50 | ″ | ″ | 93.0 |
| 5 | 11.0 | 1.0 | 5.5 | ″ | ″ | ″ | 96.1 |
| 6 | 11.0 | 2.0 | 5.5 | ″ | ″ | ″ | 96.7 |
| 7 | 11.0 | 4.0 | 5.5 | ″ | ″ | ″ | 96.1 |
| 8 | 11.0 | — | 4.0 | 55 | 90 | 30.2 | 96.4 |
| 9 | 11.0 | — | 5.8 | 50 | ″ | 36.2 | 90.8 |
| 10 | 11.0 | 1.0 | 5.8 | 50 | ″ | 34.3 | 97.4 |
| 11 | 11.0 | 2.0 | 5.8 | 50 | ″ | 29.1 | 98.3 |
| 12 | 11.0 | 3.0 | 5.8 | 50 | 96 | 30.9 | 99.3 |
| 13 | 11.0 | 3.0 | 6.1 | 50 | 72 | 30.0 | 99.0 |
| 14 | 11.0 | 3.0 | 6.2 | 50 | 72 | 30.0 | 99.1 |

It can be seen from the above examples that, in the absence of amylo-1,6-glucosidase, substantially lower yields of dextrose are obtained.

EXAMPLES 15–22

The following examples show what the effect total starch solids has on the production of dextrose with (1) an enzyme system comprising glucoamylase and amylo-1,6-glucosidase and (2) an enzyme system comprising glucoamylase. The conditions and procedures for saccharification for all systems were the same as that reported in Examples 1–14 except for the differences reported in Table II below.

TABLE II

| Example | Units of Enzyme GAM | Units of Enzyme A-1,6-G | Total Starch Solids | pH | Time Hrs. at 55°C. | Dextrose Yield |
|---|---|---|---|---|---|---|
| 15 | 9 | 3 | 20 | 6.0–6.2 | 96 | 99.1 |
| 16 | 9 | 3 | 30 | 6.0–6.2 | 96 | 98.6 |
| 17 | 9 | 3 | 40 | 6.0–6.2 | 96 | 97.1 |
| 18 | 9 | 3 | 50 | 6.0–6.2 | 96 | 94.5 |
| 19 | 9 | — | 20 | 4.2–4.4 | 96 | 97.9 |
| 20 | 9 | — | 30 | 4.2–4.4 | 96 | 96.6 |
| 21 | 9 | — | 40 | 4.2–4.4 | 96 | 94.8 |
| 22 | 9 | — | 50 | 4.2–4.4 | 96 | 92.0 |

EXAMPLES 23–30

The following examples show what effect the use of a higher pH has on the dextrose yields when only glucoamylase is used. The conditions and procedures for saccharifications were essentially the same as those used in Example 1–14 except for those reported in Table III below. Examples 29 and 30 are the same as Examples 12 and 13 reported in Table I and have been reproduced only for making a comparison more convenient.

TABLE III

| Example | Units of Enzyme GAM | Units of Enzyme A-1,6-G | Total Starch Solids | pH | Temp. °C. | Time Hrs. | Dextrose Yields |
|---|---|---|---|---|---|---|---|
| 23 | 10 | — | 30.0 | 4.2 | 55 | 96 | 95.7 |
| 24 | 10 | — | 30.0 | 6.0 | 55 | 96 | 91.7 |
| 25 | 15 | — | 30.0 | 6.0 | 55 | 96 | 94.5 |
| 26 | 20 | — | 30.0 | 6.0 | 55 | 96 | 95.4 |
| 27 | 30 | — | 30.0 | 6.0 | 55 | 96 | 95.6 |
| 28 | 40 | — | 30.0 | 6.0 | 55 | 96 | 95.6 |
| 29 | 9.0 | 3.0 | 30.9 | 5.8 | 50 | 96 | 99.3 |
| 30 | 9.0 | 3.0 | 30.0 | 6.1 | 50 | 72 | 99.0 |

Since many embodiments of this invention may be made and since many changes may be made in the embodiments described, the foregoing is interpreted as illustrative and the invention is defined by the claims appended hereafter.

What is claimed is:

1. In a process for producing a conversion syrup of a high dextrose content by saccharifying, under acid conditions, a thinned starch hydrolyzate to dextrose with glucoamylase, the improvement which comprises saccharifying the thinned hydrolyzate to dextrose at pH between 5.0 and 6.7 in the presence of an enzyme system comprising glucoamylase and an effective amount of amylo-1,6-glucosidase to hydrolyze 1,6-glucosidic linkages of the hydrolyzate with the saccharification being conducted at a pH sufficient to inhibit the reversionary action of glucoamylase and thereby obtain improved yields of dextrose.

2. The process according to claim 1 wherein the thinned starch hydrolyzate has a dry solids content of 20% to 55% by weight.

3. The process according to claim 2 wherein the thinned hydrolyzate is saccharified in the presence of at least 0.5 units of pullulanase per gram of starch solids.

4. The process according to claim 1 wherein the glucoamylase is substantially free from transglucosidase and is obtained from at least one microorganism selected from the genus of Aspergillus, Clostridium, Mucor and Rhizopus.

5. The process according to claim 4 wherein the thinned starch hydrolyzate has a dry solids content from 30% to 50% by weight and is saccharified to dextrose with an Aspergillus glucoamylase.

6. The process according to claim 2 wherein the saccharification of the thinned starch hydrolyzate to dextrose is conducted in the presence of an enzyme system substantially free from transglucosidase and the enzyme system consisting essentially of glucoamylase and pullulanase at a potency ratio of 1.5 to 4.0 units of glucoamylase for each unit of pullulanase.

7. The process according to claim 6 wherein the thinned starch hydrolyzate is saccharified to dextrose with an Aspergillus glucoamylase.

8. The process according to claim 7 wherein the thinned starch hydrolyzate contains at least about 30% by weight dry solids.

9. The process according to claim 2 wherein the saccharification is conducted at a pH of at least 5.5 in the presence of amylo-1,6-glucosidase and glucoamylase at a potency ratio of 0.05 to 0.8 units amylo-1,6-glucosidase per unit of glucoamylase and the enzyme system is substantially free from transglucosidase.

10. The process according to claim 2 wherein the saccharification of the thinned starch hydrolyzate is conducted at a pH of 5.5 to 6.3.

11. The process according to claim 10 wherein the enzyme system has a potency ratio of about 1.5 units to about 4.0 units of glucoamylase for each unit of amylo-1,6-glucosidase.

12. The process according to claim 10 wherein the enzyme system comprises Rhizopus glucoamylase and pullulanase and the thinned starch hydrolyzate contains at least about 30% by weight dry solids.

13. The process according to claim 11 wherein the thinned hydrolyzate is saccharified to dextrose with Aspergillus glucoamylase in the presence of pullulanase and the thinned starch hydrolyzate contains at least 30% by weight dry solids.

14. The process according to claim 10 wherein the thinned starch hydrolyzate contains about 30% to 40% by weight dry solids and the enzyme system comprises from 0.5 to 6.0 units of pullulanase per gram of dry starch solids and from 4 to 15 units of glucoamylase per gram of dry starch solids and the glucoamylase is derived from at least one microorganism selected from the genus of Aspergillus and Rhizopus.

15. The process according to claim 14 wherein the thinned starch hydrolyzate is saccharified to dextrose with an Aspergillus glucoamylase.

16. The process according to claim 2 wherein amylo-1,6-glusoidase consists essentially of isoamylase.

17. The process of claim 10 wherein the enzyme system also contains alpha-amylase in an amount sufficient to inhibit retrogradation of the thinned starch.

18. A process for producing dextrose comprising saccharifying a thinned starch hydrolyzate to dextrose with an enzyme system comprising glucoamylase and an effective amount of amylo-1,6-glucosidase at a pH between about 5.8 and 6.3.

19. The process of claim 17 wherein the enzymes are present in said enzyme system in a potency ratio equivalent to 0.05–0.8 units of amylo-1,6-glucosidase per unit of glucoamylase.

20. The process of claim 18 wherein the enzymes are present in said enzyme system in a potency ratio equivalent to 1.5–4.0 units of glucoamylase per unit of amylo-1,6-glucosidase.

* * * * *